(12) United States Patent
Kuroki

(10) Patent No.: US 6,346,833 B1
(45) Date of Patent: Feb. 12, 2002

(54) FREQUENCY MULTIPLIER CIRCUIT

(75) Inventor: Ryuta Kuroki, Miyazaki (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/640,753

(22) Filed: Aug. 18, 2000

(30) Foreign Application Priority Data

Oct. 29, 1999 (JP) ............................................. 11-309540

(51) Int. Cl.[7] ................................................ H03B 19/00
(52) U.S. Cl. ........................ 327/119; 327/116; 377/47; 331/53; 708/103
(58) Field of Search ................................. 327/113, 114, 327/115–117, 119–122; 377/46, 47–49, 44, 52; 331/57, 51–53; 708/101, 103

(56) References Cited

U.S. PATENT DOCUMENTS 4,017,719 A * 4/1977 Kaplan et al. ............... 708/101
4,244,027 A * 1/1981 Shai ............................ 708/103
4,339,722 A * 7/1982 Sydor et al. .................. 377/47

* cited by examiner

*Primary Examiner*—Timothy P. Callahan
*Assistant Examiner*—Minh Nguyen
(74) *Attorney, Agent, or Firm*—Volentine Francos, PLLC

(57) ABSTRACT

A frequency multiplier circuit outputs a desired frequency, wherein a frequency of a reference clock is divided by 4 by a frequency divider, the frequency of a unit clock is divided by 2 by another frequency divider and the output of these dividers are provided to an AND gate. A variable frequency divider divides the frequency of an output from the AND gate by n. An up-counter counts the number of pulses of the output from the variable frequency divider. Another variable frequency divider divides the frequency of the unit clock by the number of pulses to output a signal having a frequency of the reference clock multiplied by n.

12 Claims, 5 Drawing Sheets

FREQUENCY MULTIPLIER CIRCUIT

BACKGROUND OF THE INVENTION

1. Field of the Invention

The present invention relates to a frequency multiplier circuit that achieves a desired frequency by multiplying the frequency of a reference clock.

2. Description of the Related Art

A frequency multiplier circuit in the prior art comprises a PLL (phase-locked loop) circuit, a frequency divider circuit and the like. In the prior art, a signal indicating a phase difference between a feedback clock and a reference clock is converted to an analog voltage by using a charge pump and a low pass filter inside the PLL circuit and a desired frequency is achieved by controlling a voltage-controlled oscillator in the PLL circuit with the analog voltage.

However, the following problem arises in a frequency multiplier circuit employing the PLL circuit in the prior art.

Since the PLL circuit includes an analog circuit, the inconsistency in the manufacturing process and the operating conditions such as source voltage fluctuations or operating temperature greatly affect the characteristics of the PLL circuit. For this reason, the desired frequency may not be always achieved.

SUMMARY OF THE INVENTION

In order to address the problem discussed above, the frequency multiplier circuit that outputs a frequency achieved by multiplying the frequency of a reference clock in a first invention assumes the following structure.

Namely, the frequency multiplier circuit comprises a first frequency divider that divides the frequency of the reference clock by 4, a second frequency divider that divides the frequency of the unit clock, which is higher than the frequency of the reference clock by 2, an AND means that obtains the AND of an output signal from the first frequency divider and an output signal from the second frequency divider, a first variable frequency divider that divides an output signal from the AND means by n using variable frequency division data n (n is a positive integer) provided from the outside, an up-counter that counts the number of pulses Y in an output signal from the first variable frequency divider over intervals each corresponding to a half cycle of the output signal from the first frequency divider and a second variable frequency divider that divides the frequency of the unit clock by Y by taking in the number of pulses Y obtained through the count as frequency division data and outputs a signal achieved by multiplying the frequency of the reference clock by n.

By adopting the structure described above, the AND of the output signals from the first frequency divider and the second frequency divider is calculated by the AND means and then the AND is divided by n by the first variable frequency divider. The number of pulses Y in the output signal from the first variable frequency divider is counted by the up-counter over intervals each corresponding to a half cycle of the output signal from the first frequency divider. The second variable frequency divider divides the frequency of the unit clock by the number of pulses Y and a signal with a frequency achieved by multiplying the frequency of the reference clock by n is obtained. In other words, the frequency multiplier circuit is achieved without using any analog circuit components that are affected by inconsistencies in the manufacturing process and the operating conditions.

In a second invention, a third variable frequency divider described below is provided in the frequency multiplier circuit in the first invention.

The third variable frequency divider, which is connected to either the input side or the output side of the first frequency divider, operates in conjunction with the first frequency divider to divide the frequency of the reference clock by (4×m) using variable frequency division data m (m is a positive integer) provided from the outside and to provide the results of the frequency division to the AND means.

In this structure, the number of pulses Y counted by the up-counter in the first invention is multiplied by m.

In a third invention, the first frequency divider, the second frequency divider, the AND means, the first variable frequency divider, the up-counter and the second variable frequency divider in the frequency multiplier circuit in the first invention are formed at a common board at which an internal oscillator that generates the unit clock is formed.

In this structure, the unit clock is internally generated by the internal oscillator. The process conditions and the operating conditions of the internal oscillator can be matched with those of the other circuits.

In a fourth invention, the first frequency divider, the second frequency divider, the AND means, the first variable frequency divider, the up-counter, the second variable frequency divider and the third frequency divider in the frequency multiplier circuit in the second invention are formed at a common board at which an internal oscillator that generates the unit clock is formed.

In this structure, the unit clock is internally generated by the internal oscillator and the process conditions and the operating conditions of the internal oscillator can be matched with those of the other circuits.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

First Embodiment

Figure 1:
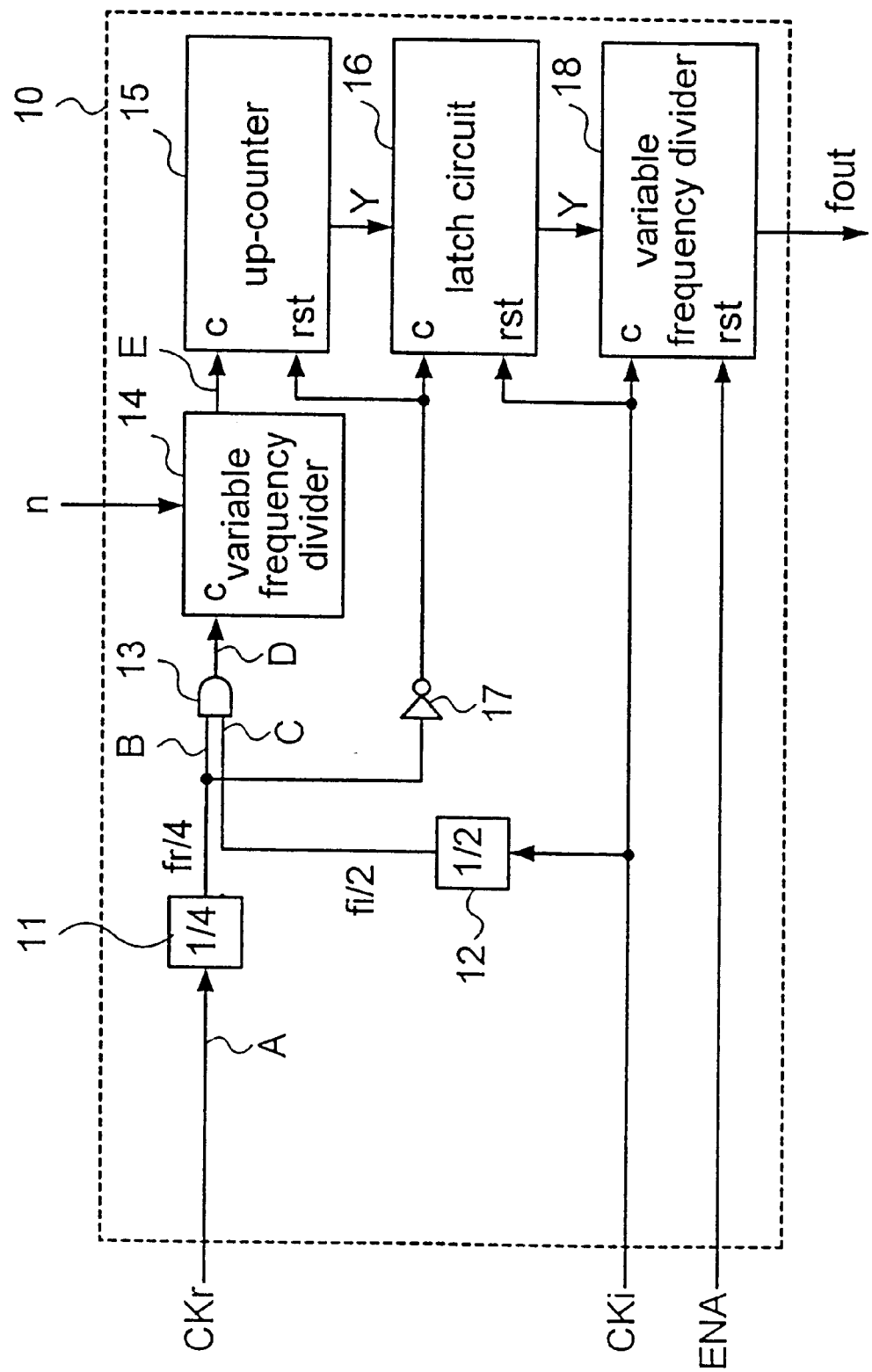
FIG. 1 is a block diagram of the frequency multiplier circuit in a first embodiment of the present invention.

FIG. 1 is a block diagram of the frequency multiplier circuit in the first embodiment of the present invention.

This frequency multiplier circuit 10 is provided with a first frequency divider 11, a second frequency divider 12 and a two-input AND gate 13. The first frequency divider 11 divides the frequency fr of a reference clock CKr provided from the outside by 4. The second frequency divider 12 divides the frequency fi of a unit clock CKi which is higher than the frequency fr of the reference clock CKr by 2. The two-input AND gate 13 constitutes an AND means. The output terminals of the frequency dividers 11 and 12 are connected to the individual input terminals of the AND gate 13.

The output side of the AND gate 13 is connected to a clock terminal c of a first variable frequency divider 14. The variable frequency divider 14 is provided with variable frequency division data n from the outside. The output side of the variable frequency divider 14 is connected to a clock terminal c of an up-counter 15, with the output side of the up-counter 15 connected to a latch circuit 16. The output side of the frequency divider 11 is connected to a reset terminal rst of the up-counter 15 and a clock terminal c of the latch circuit 16 via an inverter 17.

A second variable frequency divider 18 is provided at the output side of the latch circuit 16. The unit clock CKi is provided to a clock terminal c of the variable frequency divider 18 and a reset terminal rst of latch circuit 16. In addition, the variable frequency divider 18 is provided with frequency division data Y by the latch circuit 16. An enable signal ENA is input to the reset terminal rst of variable frequency divider 18.

Figure 2:
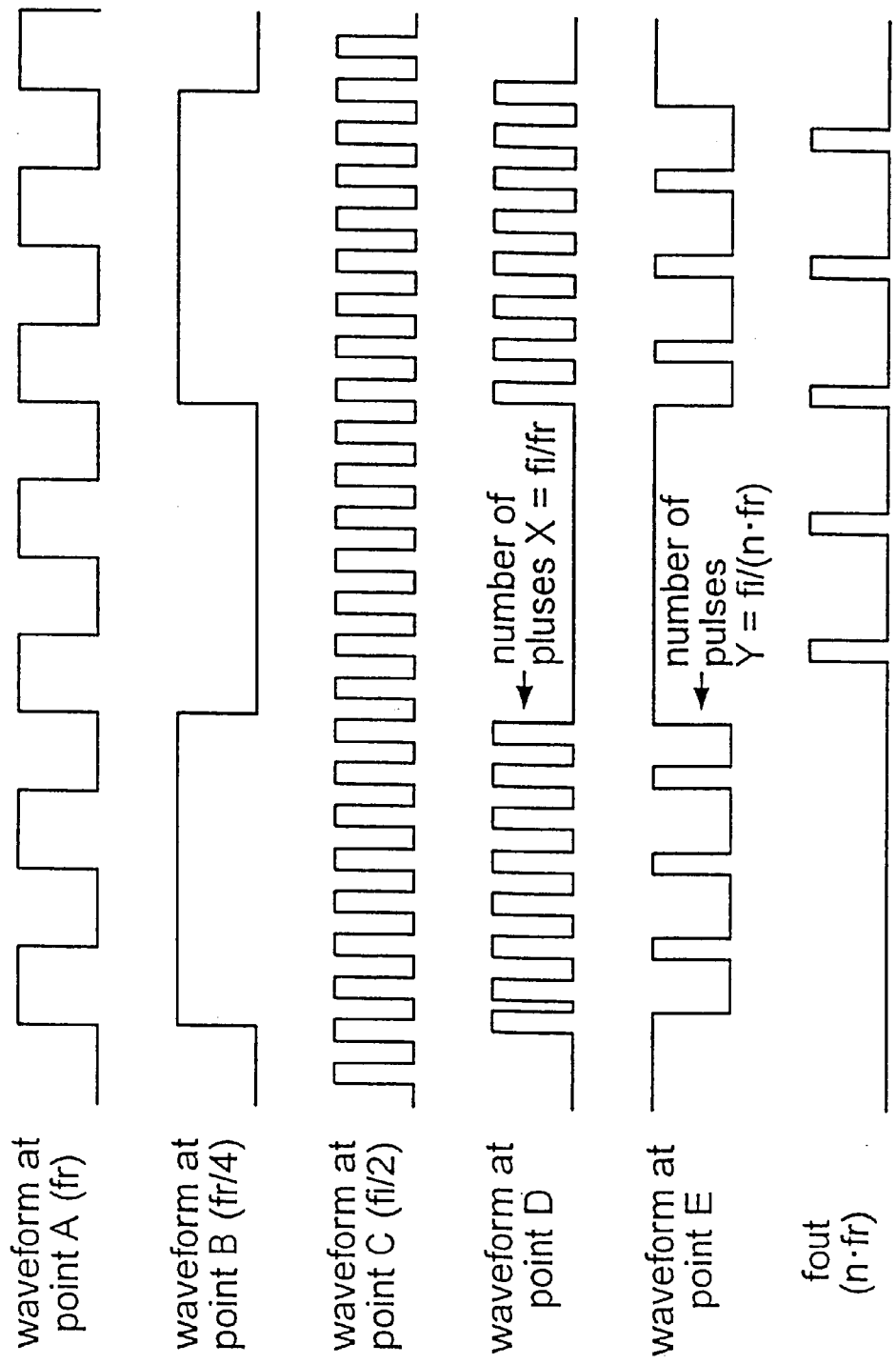
FIG. 2 is a time chart presenting the operating waveforms achieved in the frequency multiplier circuit in FIG. 1.

FIG. 2 is a time chart presenting the operating waveforms achieved in the frequency multiplier circuit in FIG. 1. The operation of the frequency multiplier circuit in FIG. 1 is now explained in reference to FIG. 2.

The input side of the frequency divider 11, the output side of the frequency divider 11, the output side of the frequency divider 12, the output side of the AND gate 13 and the output side of the variable frequency divider 14 are respectively referred to as point A, point B, point C, point D and point E. The frequency divider 11 divides the frequency fr of the reference clock CKr on point A by 4 and outputs an output signal having a frequency fr/4 and a duty ratio of approximately 50% to point B. Likewise, the frequency divider 12 divides the frequency fi of the unit clock CKi by 2 and outputs an output signal having a frequency fi/2 and a duty ratio of approximately 50% to point C.

The AND gate 13 having the signal with the frequency fr/4 and the signal with the frequency fi/2 input therein from point B and point C respectively then calculates the AND of these signals. Namely, when the level of the signal with the frequency fr/4 generated by using the reference clock CKr is at "1", the signal with the frequency fi/2 is allowed to pass and a signal with the number of pulses X at (fi/fr) is output to point D during a period of time corresponding to a half cycle of the signal on point B.

The variable frequency divider 14 divides the frequency of the signal provided from point D by n by using frequency division data n provided from the outside for feedback. As a result of this frequency division, a signal with the number of pulses Y at (fi/(n·fr)) is output to point E during a period corresponding to a half cycle of the signal on point B.

The up-counter 15 is activated by the signal on point B to count the number of pulses Y during the period of time over which the signal remains at "1". The latch circuit 16 latches the number of pulses Y resulting from the count performed by the up-counter 15 in synchronization with the fall of the signal on point B, i.e., in synchronization with a rise of the output signal from the inverter 17. The variable frequency divider 18 takes in the number of pulses Y from the latch circuit 16 as frequency division data, divides the frequency of the unit clock CKi by Y and outputs the resulting signal. When the frequency of the output signal from the variable frequency divider 18 is referred to as "fout", the frequency fout is expressed as in the following expression (1).

$$fout = fi/Y = fi/(fi/(n \cdot fr)) \qquad (1)$$
$$= fi \cdot (n \cdot fr)/fi$$
$$= n \cdot fr$$

As a result, a signal achieved by multiplying the frequency of the reference clock CKr by n is output.

The frequency accuracy of the ultimate output signal is ±2n /fi, and the maximum operating frequency is determined by the capability of the variable frequency divider 18. It is to be noted that the results of the count performed at the up-counter 15 is reset each time the signal on point B shifts to "0".

As explained above, the first embodiment, which is provided with the frequency dividers 11 and 12, the AND gate 13, the variable frequency divider 14 that divides the frequency by n indicated by the variable frequency division data n, the up-counter 15 and the variable frequency divider 18 that divides the frequency of the unit clock CKi by the number of pulses Y resulting from the count performed by the up-counter 15, does not utilize a PLL circuit that includes an analog circuit component as in the prior art. Thus, the characteristics of the frequency multiplier circuit are not affected by the inconsistency in the process or the operating conditions such as the source voltage, the operating temperature and the like within the range over which the internal logic circuit can operate normally and, as a result, a signal with the desired frequency achieved by multiplying the frequency of the reference clock CKr by n is output in a stable manner.

Second Embodiment

Figure 3:
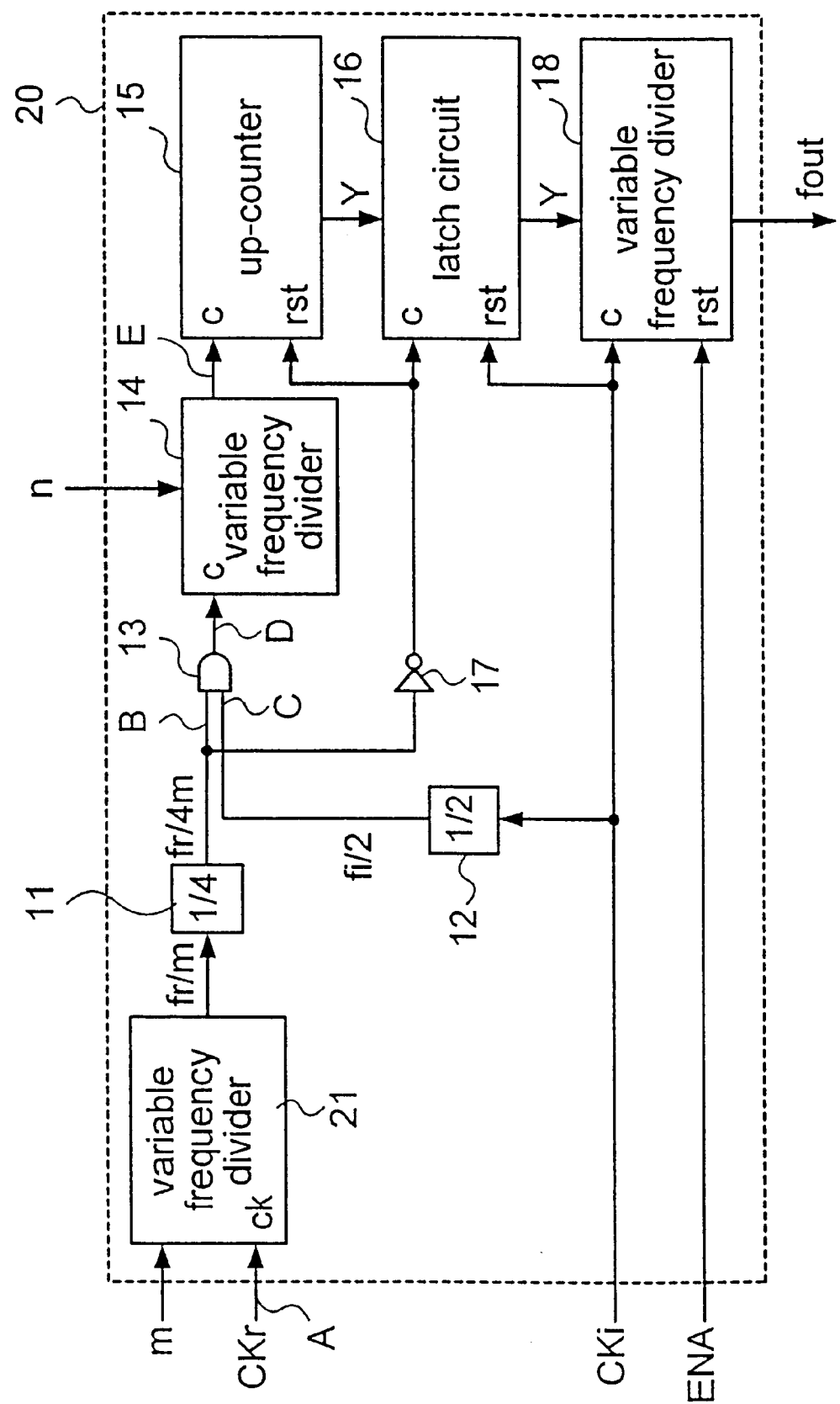
FIG. 3 is a block diagram of the frequency multiplier circuit in a second embodiment of the present invention.

FIG. 3 is a block diagram of the frequency multiplier circuit in the second embodiment of the present invention.

This frequency multiplier circuit 20 is achieved by adding a third variable frequency divider 21 in the frequency multiplier circuit 10 in FIG. 1 illustrating the first embodiment, and is otherwise structured identically to the first embodiment.

The variable frequency divider 21 is provided with frequency division data m from the outside and with CKr which is input to its clock terminal c. The output terminal of the variable frequency divider 21 is connected to the input side of the frequency divider 11.

Figure 4:
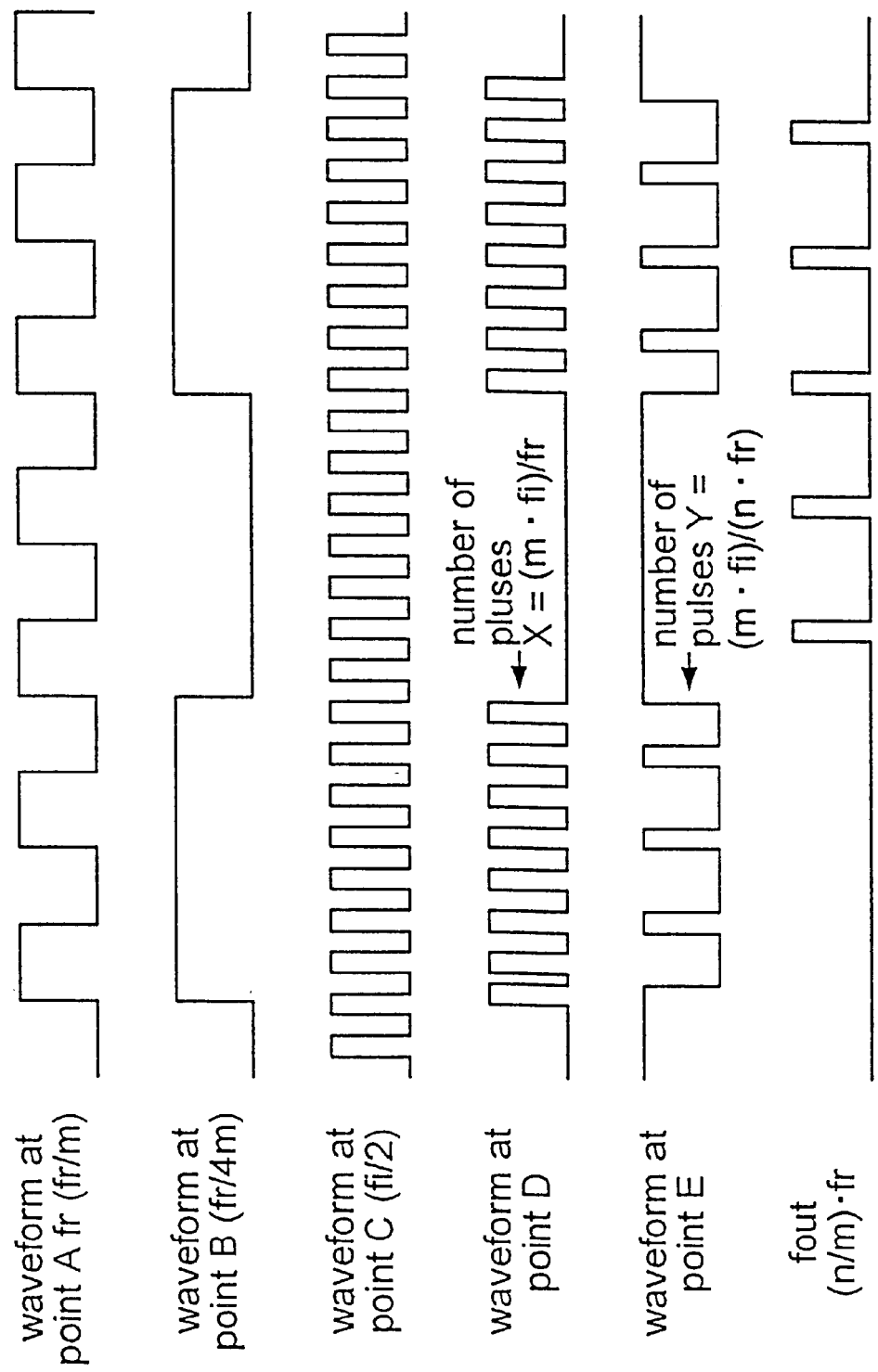
FIG. 4 is a time chart presenting the operating waveforms achieved in the frequency multiplier circuit in FIG. 3.

FIG. 4 is a time chart presenting the operating waveforms achieved in the frequency multiplier circuit 20 in FIG. 3. The operation of the frequency multiplier circuit 20 in FIG. 3 is now explained in reference to FIG. 4.

The input side of the variable frequency divider 21, the output side of the frequency divider 11, the output side of the frequency divider 12, the output side of the AND gate 13 and the output side of the variable frequency divider 14 are respectively referred to as point A, point B, point C, point D and point E.

The variable frequency divider 21 divides the frequency fr of the reference clock CKr on point A by m and the frequency divider 11 divides the frequency of the output signal from the variable frequency divider 21 by 4. Through the frequency divisions performed by the variable frequency divider 21 and the frequency divider 11, the frequency fr of the reference clock CKr is divided by (4·m) and a signal with a frequency fr/(4·m) and a duty ratio of approximately 50% is output to point B.

The frequency divider 12 divides the frequency fi of the unit clock CKi by 2 and outputs an output signal having a frequency fi/2 and a duty ratio of approximately 50% to point C, as in the first embodiment. The AND gate 13 having the signal with the frequency fr/(4·m) and the signal with the frequency fi/2 input therein from point B and point C respectively then calculates the AND of these signals. As a result, a signal with the number of pulses X at (m·fi/fr) is output to point D during a period of time corresponding to a half cycle of the signal on point B.

The variable frequency divider 14 divides the frequency of the signal provided from point D by n by using frequency division data n provided from the outside for feedback. As a result of this frequency division, a signal with the number of pulses Y at (m·fi/(n·fr)) is output to point E during a period corresponding to a half cycle of the signal on point B.

The up-counter 15 is activated by the signal on point B to count the number of pulses Y during the period of time in which the signal remains at "1". The latch circuit 16 latches the number of pulses Y resulting from the count performed by the up-counter 15 in synchronization with the fall of the signal on point B, i.e., in synchronization with a rise of the output signal from the inverter 17. The variable frequency divider 18 takes in the number of pulses Y from the latch circuit 16 as frequency division data, divides the frequency of the unit clock CKi by Y and outputs the resulting signal. When the frequency of the output signal from the variable frequency divider 18 is referred to as "fout", the frequency fout is expressed as in the following expression (2).

$$fout = fi/Y = fi/(m \cdot fi/(n \cdot fr)) \quad (2)$$
$$= fi \cdot n \cdot fr/(m \cdot fi)$$
$$= n/m \cdot fr$$

Thus, a signal achieved by multiplying the frequency of the reference clock CKr by n/m is output.

The frequency accuracy of the ultimate output signal is ±2 n /fi, and the maximum operating frequency is determined by the capability of the variable frequency divider 18. It is to be noted that the results of the count performed at the up-counter 15 is reset each time the signal on point B shifts to "0".

As explained above, the second embodiment provided with the variable frequency divider 21 supports a wider range of multiplication factors as well as achieving advantages similar to those achieved in the first embodiment.

Third Embodiment

Figure 5:
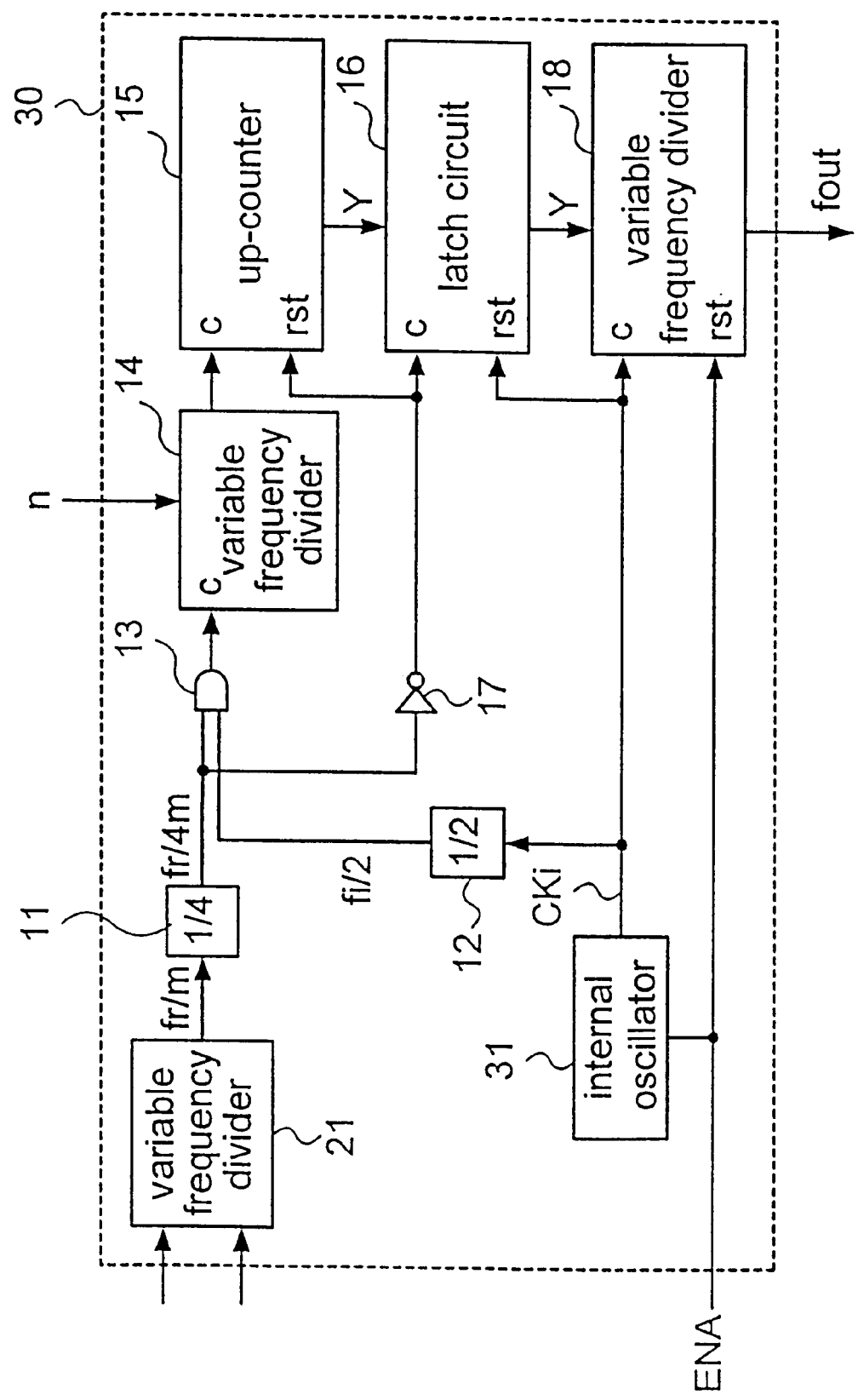
FIG. 5 is a block diagram of the frequency multiplier circuit in a third embodiment of the present invention.

FIG. 5 is a block diagram of the frequency multiplier circuit in the third embodiment of the present invention.

The frequency multiplier circuit 30 is constituted by forming an internal oscillator 31 constituted of a ring oscillator or the like and generates the unit clock CKi at the board at which the variable frequency divider 21, the frequency dividers 11 and 12, the AND gate 13, the variable frequency divider 14, the up-counter 15, the latch circuit 16, the inverter 17 and the variable frequency divider 18 in FIG. 3 are formed.

The only difference from the second embodiment is that the output terminal of the internal oscillator 31 is connected to the input side of the frequency divider 12 and the clock terminal c of the variable frequency divider 18, and connections among the other members, i.e., the variable frequency divider 21, of the frequency dividers 11 and 12, the AND gate 13, the variable frequency divider 14, the up-counter 15, the latch circuit 16, the inverter 17 and the variable frequency divider 18 are the same as those in the second embodiment.

The frequency multiplier circuit 30 structured as described above generates a unit clock CKin through oscillation of the internal oscillator 31 but otherwise engages in an operation identical to that achieved in the second embodiment to output a signal achieved by multiplying the frequency of the reference clock CKr by n/m with the same algorithm.

As explained above, the third embodiment, which is provided with the internal oscillator 31 within the frequency multiplier circuit 30, does not require any high speed input signal to be provided from the outside. In addition, since the internal oscillator 31 is formed at the board at which the variable frequency divider 21, the frequency dividers 11 and 12, the AND gate 13, the variable frequency divider 14, the up-counter 15, the latch circuit 16, the inverter 17 and the variable frequency divider 18 are formed, the inconsistency in the process and the operating conditions are matched. By setting the oscillation frequency of the internal oscillator 31 near the maximum operating frequency of the variable frequency divider 18, for instance, an operation can be performed at the frequency achieving the highest degree of accuracy.

Is this is to be noted that the present invention is not limited to the embodiments explained above and may be adopted in a number of variations.

For instance, while the variable frequency divider 21 is provided at the input side of the frequency divider 11 in the second and third embodiments, the variable frequency divider 21 may be connected to the output side of the frequency divider 11 instead. In addition, while the third embodiment assumes a structure achieved by providing the internal oscillator 31 in the frequency multiplier circuit 20 in the second embodiment, advantages similar to those achieved in the third embodiment are realized by providing the internal oscillator 31 in the frequency multiplier circuit 10 in the first embodiment instead.

As explained in detail above, according to the first invention, in which the frequency multiplier circuit comprises the first frequency divider that divides the frequency of the reference clock by 4, the second frequency divider that divides the frequency of the unit clock by 2, the AND means, the first variable frequency divider that divides the frequency of the output signal from the AND means by n, the up-counter that counts the number of pulses Y in the output signal from the first variable frequency divider and the second variable frequency divider that takes in the number of pulses Y as frequency division data and divides the frequency of the unit clock by Y, a PLL circuit that includes analog circuit components as required in the prior art is not used, so that the inconsistency in the process for the operating conditions such as the source voltage, the operating temperature and the like does not affect the characteristics at all and that a signal with a desired frequency achieved by multiplying the frequency of the reference clock by n is output in a stable manner.

According to the second invention, which is achieved by providing the third variable frequency divider in the frequency multiplier circuit in the first invention, a signal with a desired frequency achieved by multiplying the frequency of the reference clock by n/m relative to the multiplication factor in the first invention can be output in a stable manner. Thus, a wider range of multiplication factors compared to that achieved in the first embodiment is supported.

According to the third and fourth inventions, the internal oscillator is formed at the board at which the frequency multiplier circuit is formed. Consequently, it is not necessary to input a high speed signal from the outside and, at the same time, the process conditions and the operating conditions are matched to achieve an improvement in the frequency accuracy.

The entire disclosure of Japanese Patent Application No. 11-309540 filed on Oct. 29, 1999 including specification, claims, drawings and summary is incorporated herein by reference in its entirety.

What is claimed is:

1. A frequency multiplier circuit that outputs a signal achieved by multiplying a frequency of a reference clock, comprising:

a first frequency divider that divides the frequency of said reference clock by 4, to provide a first signal having a duty ratio of approximately 50%;

a second frequency divider that divides a frequency of a unit clock which is higher than the frequency of said reference clock by 2, to provide a second signal having a duty ratio of approximately 50%;

an AND gate that obtains a logical AND of the first signal from said first frequency divider and the second signal from said second frequency divider;

a first variable frequency divider that divides an output signal from said AND gate by n using variable frequency division data n (n is a positive integer) that is externally provided;

an up-counter that counts a number of pulses Y in an output signal from said first variable frequency divider over intervals corresponding to a half cycle of the first signal from said first frequency divider; and a second variable frequency divider that divides the frequency of said unit clock by Y, by using the number of pulses Y as frequency division data, and that outputs the signal that is the frequency of said reference clock multiplied by n.

2. A frequency multiplier circuit according to claim 1, wherein the number of pulses Y is provided from said up-counter to said second variable frequency divider via a latch.

3. A frequency multiplier circuit according to claim 1, further comprising:

a third variable frequency divider connected to an input side or an output side of said first frequency divider, which operates in conjunction with said first frequency divider to divide the frequency of said reference clock by (4×m) using variable frequency division data m (m is a positive integer) that is externally provided and to provide an output to said AND gate.

4. A frequency multiplier circuit according to claim 3, wherein the number of pulses Y is provided from said up-counter to said second variable frequency divider via a latch.

5. A frequency multiplier circuit according to claim 1, wherein said first frequency divider, said second frequency divider, said AND gate, said first variable frequency divider, said up-counter and said second variable frequency divider are formed at a common board, and an internal oscillator that generates said unit clock is formed at said common board.

6. A frequency multiplier circuit according to claim 5, wherein said internal oscillator includes a ring oscillator.

7. A frequency multiplier circuit according to claim 3, wherein said first frequency divider, said second frequency divider, said AND gate, said first variable frequency divider, said up-counter, said second variable frequency divider and said third variable frequency divider are formed at a common board, and an internal oscillator that generates said unit clock is formed at said common board.

8. A frequency multiplier circuit according to claim 7, wherein said internal oscillator includes a ring oscillator.

9. A method of frequency multiplication comprising:

dividing a frequency of a reference clock by 4, to provide a first signal having a duty ratio of approximately 50%;

dividing a frequency of a unit clock which is higher than the frequency of the reference clock by 2, to provide a second signal having a duty ratio of approximately 50%;

performing a logical AND operation of the first signal and the second signal to provide a logical signal;

dividing the logical signal by n using variable frequency division data n to provide a divided signal, wherein n is a positive integer;

counting a number of pulses Y in the divided signal over intervals corresponding to a half cycle of the first input signal; and dividing the frequency of the unit clock by Y to provide a signal that is the frequency of the reference clock multiplied by n.

10. The method of frequency multiplication according to claim 9, wherein the number of pulses Y resulting from the count is latched before said dividing the frequency of the unit clock by Y.

11. The method of frequency multiplication according to claim 9, further comprising:

dividing the frequency of the reference clock by m using variable frequency division data m externally provided, prior to said dividing a frequency of a reference clock by 4, wherein m is a positive integer.

12. The method of frequency multiplication according to claim 11, wherein the number of pulses Y resulting from the count is latched before said dividing the frequency of the unit clock by Y.

* * * * *